(12) United States Patent
Hoshino

(10) Patent No.: US 9,077,902 B2
(45) Date of Patent: Jul. 7, 2015

(54) IMAGE CAPTURING APPARATUS HAVING CAMERA SHAKE CORRECTION FUNCTION

(71) Applicant: Panasonic Corporation, Osaka (JP)

(72) Inventor: Takayuki Hoshino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 130 days.

(21) Appl. No.: 13/772,643

(22) Filed: Feb. 21, 2013

(65) Prior Publication Data
US 2013/0222622 A1 Aug. 29, 2013

(30) Foreign Application Priority Data

Feb. 27, 2012 (JP) .................................. 2012-039607

(51) Int. Cl.
*H04N 5/228* (2006.01)
*H04N 5/232* (2006.01)

(52) U.S. Cl.
CPC ....... *H04N 5/23248* (2013.01); *H04N 5/23258* (2013.01); *H04N 5/2328* (2013.01)

(58) Field of Classification Search
CPC ............ H04N 5/2348; H04N 5/23267; H04N 5/23287; H04N 5/23264; H04N 5/23212; H04N 5/23254; H04N 5/23251; H04N 5/2328; G03B 2207/005; G03B 2205/0015; G02B 27/646
USPC .................... 348/208.99, 208.1, 208.3, 208.4, 348/208.11, 208.13, 211.6
See application file for complete search history.

(56) References Cited

U.S. PATENT DOCUMENTS 6,778,768 B2 * 8/2004 Ohkawara et al. ............... 396/55
2011/0063458 A1 * 3/2011 Washisu et al. ............ 348/208.2

FOREIGN PATENT DOCUMENTS

| JP | 4-158342 | 6/1992 |
|----|----------|--------|
| JP | 7-327160 | 12/1995 |
| JP | 11-218794 | 8/1999 |
| JP | 11-275449 | 10/1999 |
| JP | 2001-54005 | 2/2001 |

* cited by examiner

*Primary Examiner* — Twyler Haskins
*Assistant Examiner* — Padma Haliyur
(74) *Attorney, Agent, or Firm* — Panasonic Patent Center

(57) ABSTRACT

An image capturing apparatus having a camera shake correction function, includes an optical system, a movable member that is movable on a plane perpendicular to an optical axis of the optical system to achieve the camera shake correction function, an angular velocity detector configured to detect an angular velocity of shake of the image capturing apparatus and generate a detection signal, and a controller configured to drive the movable member based on the output from the angular velocity detector. The controller includes a time change rate limiter configured to limit a time rate of change of angular velocity indicated by the detection signal output from the angular velocity detector to be no greater than a predetermined limiting value, and drive the movable member based on the detection signal output through the time change rate limiter.

4 Claims, 6 Drawing Sheets

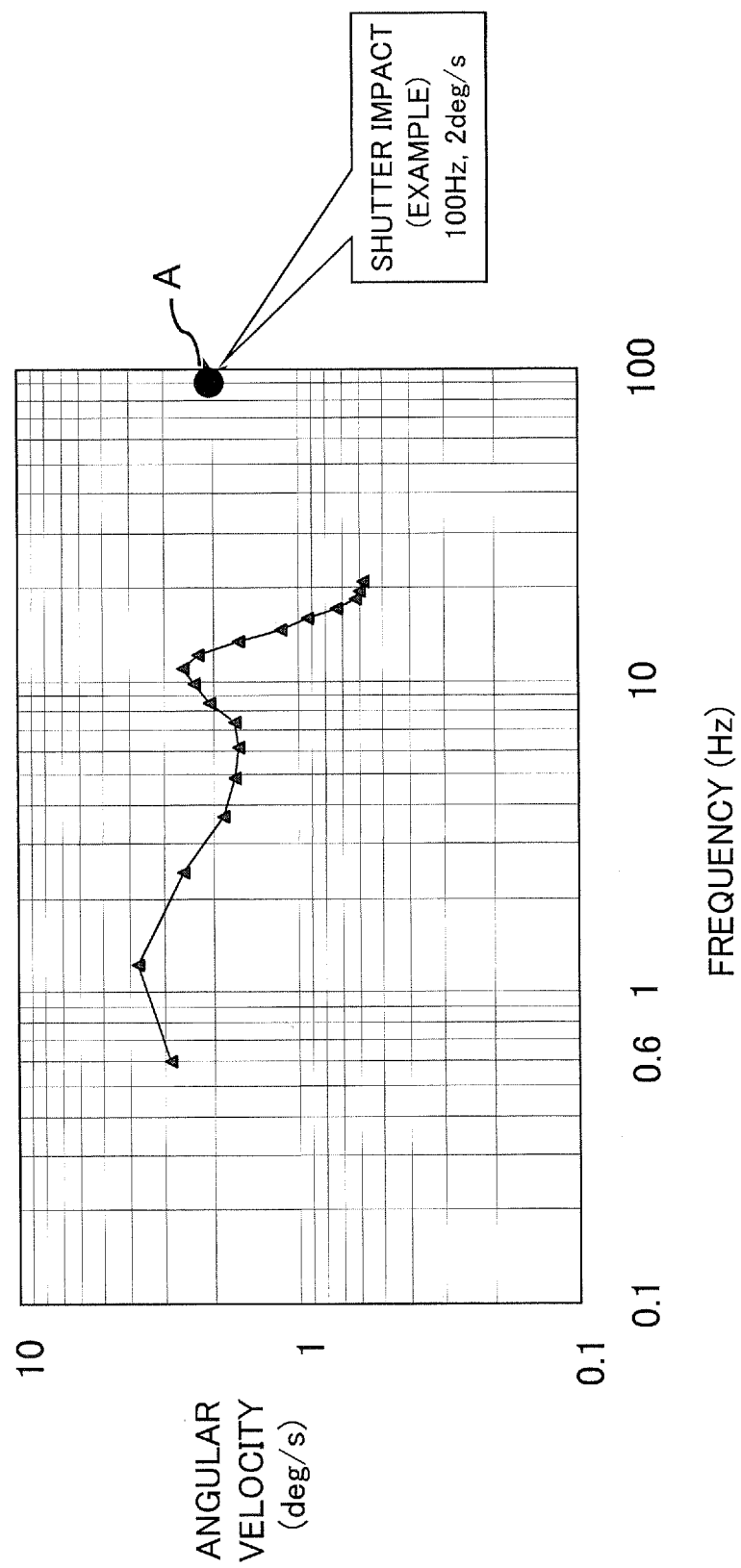

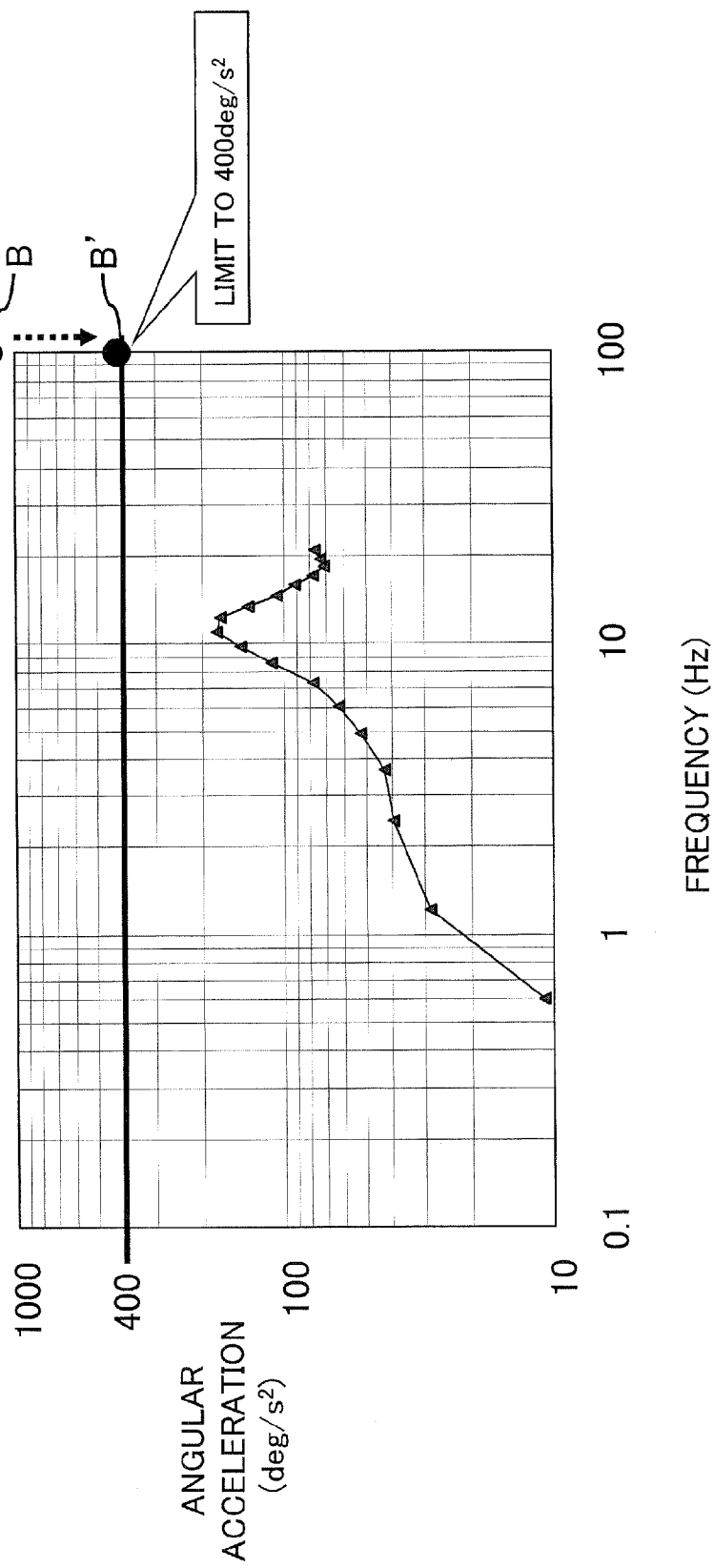

IMAGE CAPTURING APPARATUS HAVING CAMERA SHAKE CORRECTION FUNCTION

BACKGROUND

1. Technical Field

The present disclosure relates to an image capturing apparatus having camera shake correction function.

2. Related Art

As a camera shake correction device for an image capturing apparatus such as a digital still camera, a device is known which has an image stabilizing lens movably arranged on a plane orthogonal to an optical axis of a optical system and drives the image stabilizing lens with an actuator in a direction to cancel a vibration when the vibration is applied to the camera (the optical system) to correct the camera shake. Such a camera shake correction device detects the vibration applied to the camera with an angular velocity sensor, integrates a shake signal output from the angular velocity sensor to calculate displacement of the image stabilizing lens for correcting the camera shake, and drives the image stabilizing lens with an actuator such as a voice coil motor or a stepping motor.

Usually, a frequency of the camera shake caused by human hands holding the camera mainly contains frequency components of around 1 Hz, and it has the frequency bandwidth of 0.1 hertz to tens of hertz. Thus the frequency of the camera shake also contains quite low frequency components as well. Therefore, the angular velocity sensor is required to have a sensitivity high enough to detect such a low frequency but increasing the sensitivity causes the angular velocity sensor to be too sensitive to disturbance. That is, a digital still camera has a problem in that, due to disturbance such as impact, the angular velocity sensor makes false detection of a vibration other than the camera shake.

For example, a single lens camera has impact made by a focal-plane shutter running. The angular velocity sensor is likely to make false detection when such impact is applied to the camera. Since a correcting unit for correcting camera shake operates according to the output from the angular velocity sensor, the false detection by the sensor may lead to a wrong correction by the correcting unit, degrading a captured subject image. In view of the above, some methods for preventing image degradation led by false detection due to shutter-induced impact have been proposed.

For example, JP 4-158342 A discloses techniques for increasing time constant of a high frequency cutoff filter provided in signal processing of the signal from the angular velocity sensor to reduce false detection due to the shutter impact, and for decreasing a gain set in a gain controller to suppress movements of the camera shake correction lens.

The technique for increasing the time constant of the high frequency cutoff filter causes phase lag in the above described camera shake correction band, delaying operation of the camera shake correction lens with respect to the actual camera shake, and therefore, sufficient camera shake correction effect cannot be obtained.

The technique for decreasing the gain set in the gain controller reduces movement of the camera shake correction lens due to the shutter-induced impact, but also reduces the correction amount, of the real camera shake, which lowers the camera shake correction effect.

An object of the present disclosure is to provide a camera shake correction technique capable of reducing the false detection caused by high-frequency vibration such as shutter-induced impact in detecting camera shake, and an image capturing apparatus having the technique.

SUMMARY

An image capturing apparatus according to the present disclosure has a camera shake correction function. The image capturing apparatus includes an optical system, a movable member that is movable on a plane perpendicular to an optical axis of the optical system to achieve the camera shake correction function, an angular velocity detector configured to detect an angular velocity of shake of the image capturing apparatus and generate a detection signal, and a controller configured to drive the movable member based on the output from the angular velocity detector. The controller includes a time change rate limiter configured to limit a time rate of change of angular velocity indicated by the detection signal output from the angular velocity detector to a predetermined limiting value or less. The controller drives the movable member based on the detection signal output through the time change rate limiter.

The present disclosure can effectively reduce a high-frequency component such as shutter-induced impact without causing phase lag in the usual frequency band for camera shake correction, and therefore can provide an image capturing apparatus for reducing image degradation caused by false detection.

BRIEF DESCRIPTION OF THE DRAWINGS

FIG. 5 is a diagram illustrating an example of frequency distribution characteristics of an angular velocity signal generated in response to camera shake; and FIG. 6 is a diagram illustrating an example of frequency distribution characteristics of an angular acceleration signal generated in response to camera shake.

DETAILED DESCRIPTION OF EMBODIMENTS

Embodiments will be described below in detail with reference to the drawings as required. However, unnecessarily detailed description may be omitted. For example, detailed description of already known matters and redundant description of substantially the same configuration may be omitted. All of such omissions are for avoiding unnecessary redundancy in the following description to facilitate understanding by those skilled in the art.

The attached drawings and the following description are provided for those skilled in the art to fully understand the present disclosure and does not intend to limit subject matters described in the claims by the attached drawings and the following description. The embodiments will be described below with reference to the attached drawings.

1. Configuration of Image Capturing Apparatus

Figure 1:
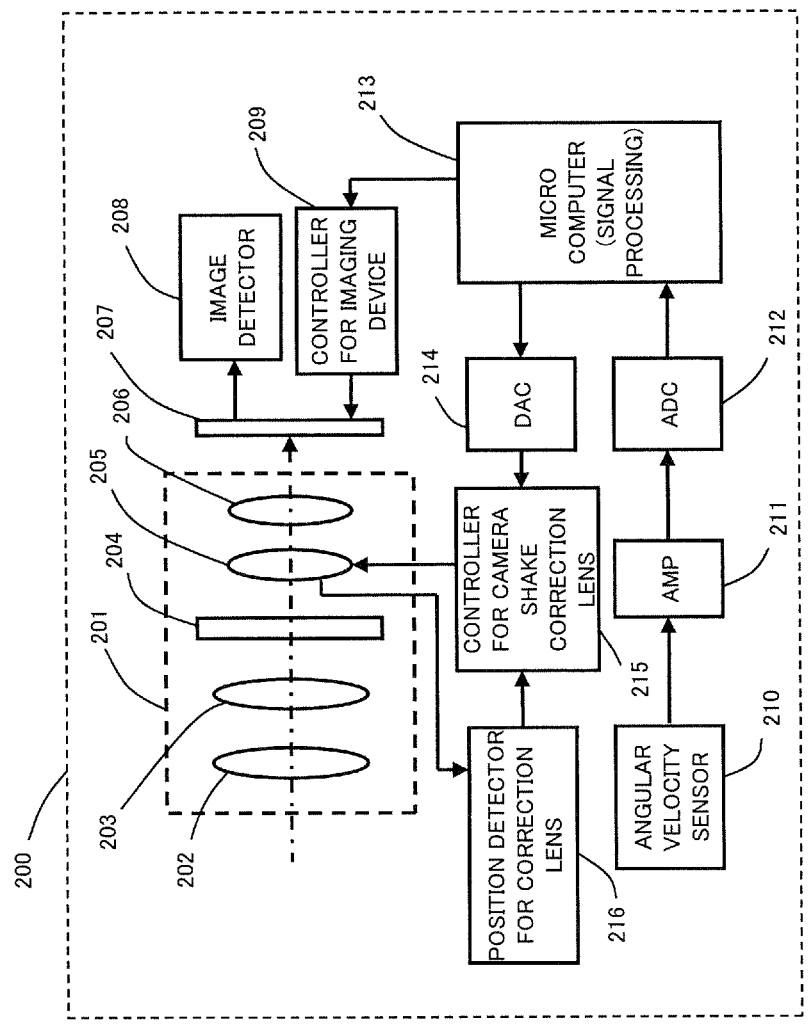
FIG. 1 is a configuration diagram of an image capturing apparatus having a camera shake correction function.

FIG. 1 is a diagram schematically illustrating an image capturing apparatus provided with a camera shake correction optical system. As shown in FIG. 1, the image capturing apparatus 200 includes an optical system 201, an imaging device 207 for capturing a subject image incident through the optical system 201 and generating an image signal, an image detector 208 for detecting an image from the image signal generated by the imaging device 207, and a drive controller 209 for controlling a drive of the imaging device 207. The optical system 201 includes an objective lens 202, a zoom lens 203, a diaphragm 204, a camera shake correction lens 205, and a focus lens 206. The imaging device 207 is implemented by a CCD image sensor, a CMOS image sensor, or an NMOS image sensor, for example.

Further, the image capturing apparatus 200 includes an angular velocity sensor 210 for detecting angular velocity of shake of the image capturing apparatus 200, an amplifying circuit 211 for amplifying an output signal from the angular velocity sensor 210, an A/D converter 212 for converting an analog signal from the amplifying circuit 211 into a digital signal, and a microcomputer 213 for deciding a direction and amount of driving the camera shake correction lens 205 based on the digital signal converted by the A/D converter 212. The microcomputer 213 may be realized by a predetermined program and a processor which executes the program, or may be realized by hardwired electronic circuits.

Further, the image capturing apparatus 200 includes a D/A converter 214 for converting a digital signal output from the microcomputer 213 into an analog signal, a drive controller 215 for driving the camera shake correction lens 205, and a position detector 216 for detecting the position of the camera shake correction lens 205.

The angular velocity of shake of the image capturing apparatus 200 is detected by the angular velocity sensor 210 and is input into the microcomputer 213 through the amplifying circuit 211 and the A/D converter 212. The microcomputer 213 performs a low frequency cut processing for cutting unnecessary direct current components contained in the angular velocity sensor 210, an integration processing for converting angular velocity information into angle information, and a phase compensation processing for compensating phase lag in the control system, thus to generate a position command signal of the camera shake correction lens 205. The position command signal is converted into an analog signal through the D/A converter 214 and is input into the drive controller 215. The drive controller 215 and the position detector 216 provide a position feedback system and perform positioning of the camera shake correction lens 205 based on the position command signal.

2. Camera Shake Correction Signal Generation Processing

Figure 2:
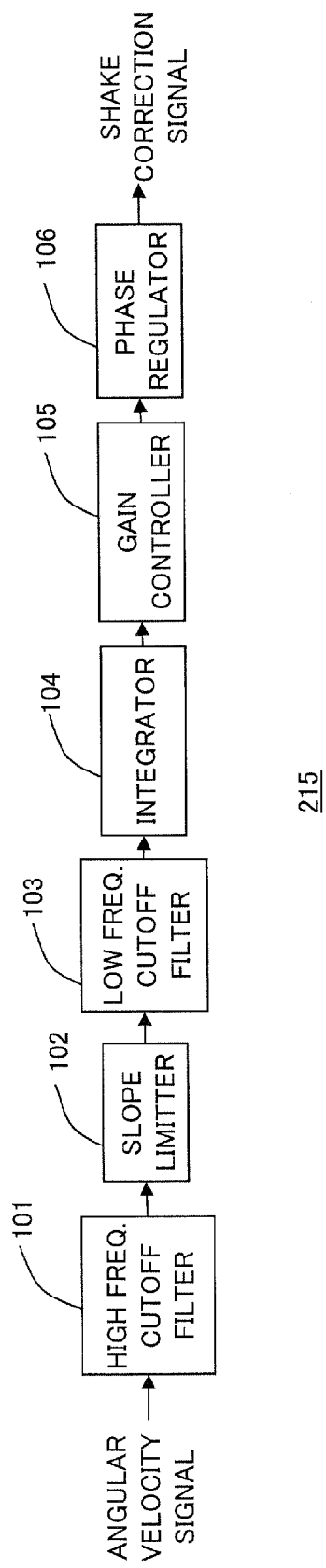
FIG. 2 is a block diagram illustrating a configuration for camera shake correction signal processing.

In the present embodiment, the camera shake correction signal generation processing is performed in the microcomputer 213 as described above. FIG. 2 illustrates a configuration for it implementing the camera shake correction signal generation processing in the microcomputer 213. As illustrated in FIG. 2, the camera shake correction signal generation processing in the present embodiment is implemented by a high frequency cutoff filter (LPF) 101, a slope limiter 102, a low frequency cutoff filter (HPF) 103, an integrator 104, a gain controller 105, and a phase regulator 106.

The angular velocity signal which is output from the angular velocity sensor 210, amplified, and converted into a digital signal is fed into the microcomputer 213. In the microcomputer 213, the input angular velocity signal is cut off its high frequency component with the high frequency cutoff filter 101 and then is fed into the slope limiter 102.

When the time rate of change (i.e., slope) of the angular velocity signal with the high frequency component cut off exceeds a predetermined limiting value, the slope limiter 102 limits the angular velocity signal not to exceed the predetermined limiting value. The limiting value for the time rate of change is set to a value which does not apply the limiting of the time rate of change (slope) to frequency components of normal camera shake, but applies the limiting of the time rate of change (slope) to a high frequency angular velocity signal caused by a shutter-induced impact.

In the angular velocity signal output from the slope limiter 102, low frequency components are cut off by the low frequency cutoff filter 103. The angular velocity signal from the low frequency cutoff filter 103 is integrated by the integrator 104 to generate a camera shake correction signal which indicates the angle of camera shake. Then, the gain and the phase of the camera shake correction signal are controlled and regulated by the gain controller 105 and the phase regulator 106 respectively, generating the final camera shake correction signal.

According to the present embodiment, especially, the time rate of change of the camera shake correction signal is limited by the slope limiter 102 in the camera shake correction generation processing. With this arrangement, influence of vibration (or shake) other than the real camera shake can be eliminated in the camera shake correction signal, and wrong operation in the camera shake correction can be prevented. For example, when a shutter mechanism begins to operate in the image capturing apparatus 200, impact induced by the operation of the shutter mechanism (shutter-induced impact) is applied to the image capturing apparatus 200. When such shutter-induced impact occurs, the time rate of change of the camera shake correction signal increases. Therefore, the present embodiment limits the time rate of change of the camera shake correction signal to cause the time rate of change not to exceed a predetermined value to eliminate the high-frequency components caused by vibration other than the real camera shake (for example, shutter-induced impact), thus to prevent wrong operation in camera shake correction.

Figure 3:
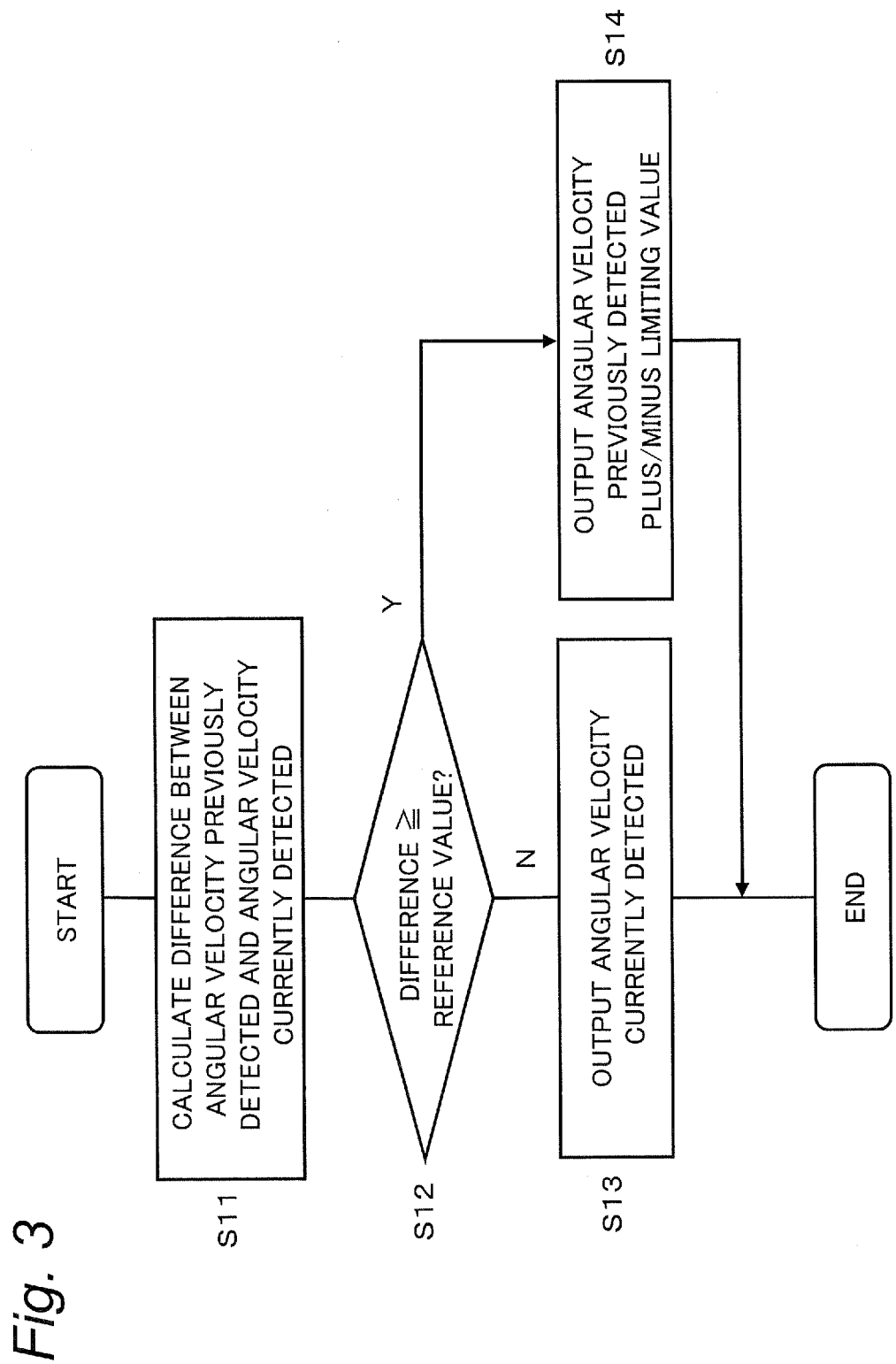
FIG. 3 is a flow chart for describing processing of a slope limiter.

FIG. 3 is a flow chart for describing a processing of the slope limiter 102. The slope limiter 102 calculates a difference between the value indicated by the angular velocity signal which is input in the previous control period and the value indicated by the angular velocity signal which is input in the present control period (S11). The slope limiter 102 compares the absolute value of the obtained difference with a predetermined threshold value (S12). Here, the threshold value is set correspondingly to the limiting value for the time rate of change of the angular velocity signal. When the absolute value of the obtained difference is smaller than the threshold value, the slope limiter 102 outputs the value indicated by the angular velocity signal, which is input in the present control period, as it is (S13). On the other hand, when the absolute value of the obtained difference is equal to or more than the threshold value, the slope limiter 102 outputs the value obtained by adding the threshold value to, or subtracting the threshold value from, a value indicated by the angular velocity signal which is input in the previous control period (S14). Here, when the obtained difference is positive, the threshold value is added to the value indicated by the angular velocity signal which is input in the previous control period. When the obtained difference is negative, the threshold value is subtracted from the value indicated by the angular velocity signal which is input in the previous control period. The slope limiter 102 limits the time rate of change of the angular velocity signal not to exceed the limiting value by performing the above described processes.

Figure 4:
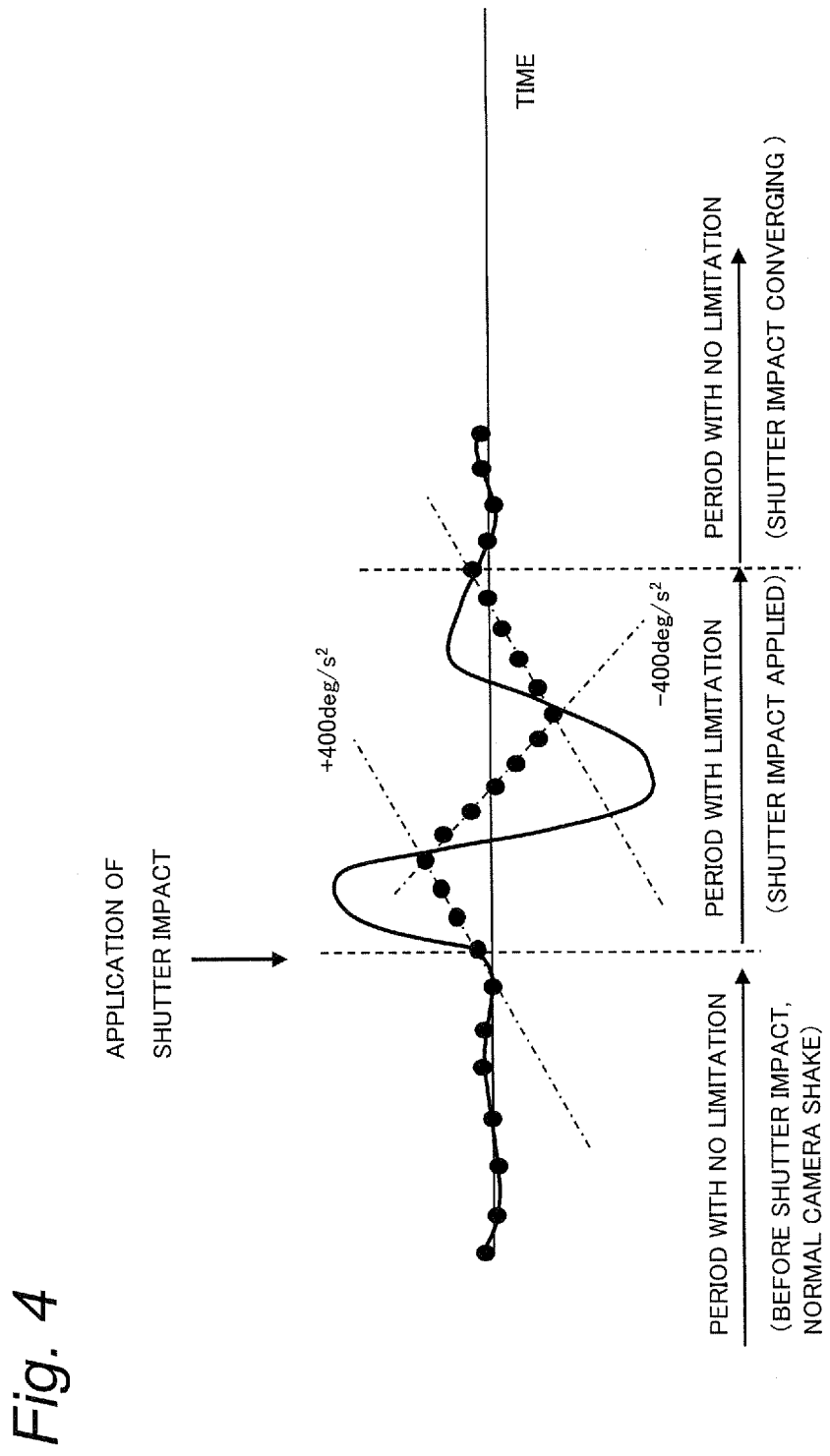
FIG. 4 is a diagram for describing generation processing of an angular velocity signal when shutter-induced impact is applied.

Now, a specific example of the camera shake correction signal generation processing performed by the microcomputer 215 of the image capturing apparatus 200 in response to application of the shutter-induced impact will be described with reference to FIG. 4. FIG. 4 illustrates the angular velocity signal at the time when the angular velocity sensor 210 detects an angular velocity which contains a high-frequency component led by the shutter-induced impact on exposure operation. In FIG. 4, the solid line indicates the angular velocity signal which is really output from the angular velocity sensor 210. The dot plot indicates the output signal from the slope limiter 102, i.e., the angular velocity signal with the time rate of change being limited not to exceed the limiting value.

As illustrated in FIG. 4, the angular velocity sensor 210 detects the usual camera shake before the shutter-induced impact is applied. During that period, the time rate of change of the angular velocity signal does not exceed the limiting value. Therefore, no limitation is applied to the time rate of change by the slope limiter 102 for the angular velocity detected by the angular velocity sensor 210. During the period for which the exposure operation is started by the image capturing apparatus 200 and then the shutter-induced impact is being applied, the angular velocity sensor 210 detects the angular velocity containing a high frequency component led by the shutter-induced impact. Therefore, the time rate of change of the angular velocity signal exceeds the limiting value. Accordingly, limitation on the time rate of change is applied by the slope limiter 102 to the angular velocity signal detected by the angular velocity sensor 210. During the period in which the shutter-induced impact is converged, the angular velocity signal detected by the angular velocity sensor 210 hardly contains high-frequency components led by the shutter-induced impact. Therefore, limitation on the time rate of change is not applied by the slope limiter 102 to the angular velocity signal detected by the angular velocity sensor 210.

As described above, when the time rate of change (slope) of the input angular velocity signal exceeds the predetermined limiting value (reference value), the microcomputer 213 replaces the time rate of change (slope) of the angular velocity signal detected at the moment with the limiting value to generate the camera shake correction signal. Accordingly, the present disclosure can effectively reduce a high speed misdetection component such as shutter-induced impact.

FIG. 5 is a diagram illustrating frequency distribution characteristics of angular velocity at the maximum camera shake which are measured for a large number of subjects. In the band between 0.6 Hz and 20 Hz, the angular velocity at the maximum camera shake is distributed at 1 to 4 deg/s. The camera shake correction system has an object to suppress the camera shake within such a range. On the other hand, the shutter-induced impact waveform (plot A) is found in another band around 100 Hz which is out of the frequency band related to the camera shake. When the bands are separated by using a filter as in the conventional art, the shutter-induced impact waveform can be reduced, but phase lag occurs for the signals in the band up to 20 Hz, which adversely affects the camera shake correction band.

FIG. 6 is a diagram illustrating frequency distribution characteristics of an angular acceleration which is calculated based on the angular velocity illustrated in FIG. 5. When the limiting value is set at, for example, 400 deg/s$^2$, the slope of the angular velocity signal due to the shutter-induced impact is securely limited while the slope of the camera shake angular velocity signal in the camera shake correction band between 0.6 Hz and 20 Hz is not limited. For example, when the shutter-induced impact of 100 Hz with the angular velocity of 2 deg/s is detected by the angular velocity sensor 210, the maximum angular acceleration is $2\pi \times 100$ Hz$\times 2$ deg/s=1257 deg/s$^2$ (plot B). In this case, the angular acceleration is limited to the limiting value 400 deg/s$^2$ (plot B') by the slope limiter 201 and the amplitude of the angular acceleration is reduced to about ⅓. Therefore, the amplitude of the camera shake correction lens 205 with the slope limitation is reduced to one-third of that without the slope limitation, so that image degradation caused by detection of the high-frequency component such as the shutter-induced impact can be reduced. Further, since bands are not separated by using a filter as in the conventional art, the detected component of the high-frequency component such as shutter-induced impact can be efficiently reduced without calling phase lag in the usual camera shake correction band. Meanwhile, although the limiting value is set at 400 deg/s$^2$ as an exemplary value, the limiting value may be set at any other value. For example, the limiting value may be set at a value no less than 400 deg/s$^2$.

3. Effects and the Like

As described above, the image capturing apparatus 200 according to the present disclosure has a camera shake correction function, and includes the optical system 201, the member to which the camera shake correction is applied (the camera shake correction lens 205 or the imaging device 207) movable on a plane perpendicular to the optical axis of the optical system 201 to perform camera shake correction, the angular velocity sensor 210 for generating a detection signal by detecting the angular velocity of the shake of the image capturing apparatus 200, and the microcomputer 213 for driving the member to which the camera shake correction is applied based on the output from the angular velocity sensor 210. The microcomputer 213 includes the slope limiter 102 for limiting the time rate of change (slope) of the detection result of the angular velocity indicated by the detection signal (the camera shake correction signal) output from the angular velocity sensor 210 to a predetermined limiting value or less. The microcomputer 213 drives the member to which the camera shake correction is applied based on the detection signal (the camera shake correction signal) output through the slope limiter 102.

With the above described configuration, the maximum value of the time rate of change of the camera shake correction signal is limited. As a result, influence of high-frequency vibration other than the real camera shake can be eliminated in the camera shake correction signal, so that wrong operation in camera shake correction can be prevented.

Other Embodiments

As described above, the first embodiment has been discussed as an example of the technology disclosed in the present application. However, the technology in the present disclosure is not limited to that embodiment and may also be applied to embodiments which are subject to modification, substitution, addition, or omission as required. Also, the respective elements described in the first embodiment may be combined to form a new embodiment. The other embodiments will be exemplified below.

The above described example is one of the embodiments. An image capturing apparatus having a so-called lens shift type camera shake correction system which moves the camera shake correction lens 205 is exemplified in the present embodiment. However, the idea of the present embodiment is not limited to such an image capturing apparatus. The idea of the present embodiment may also be applied to even an image capturing apparatus having a so-called imaging device shift type camera shake correction system which moves the imaging device 207. Further, the idea of the present embodiment may also be applied to an image capturing apparatus having a camera shake correction system which uses a variable angle prism having an accordion section filled with high refractive index fluid.

The above described embodiment has been discussed as an example in which the function of the slope limiter 102 is enabled constantly. However, the function of the slope limiter 102 may not be enabled constantly. The function of the slope limiter 102 may be enabled only when a predetermined event occurs which may cause the angular velocity signal from the angular velocity sensor 210 to contain a noise component made by a vibration other than the real camera shake. For example, the function of the slope limiter 102 may be enabled during the shutter operation or the autofocus operation.

In the case where the slope limiter 102 is enabled during the shutter operation, it is possible that the microcomputer 213 makes the slope limiter 102 to function for a period between the time when depression of the release button is detected and the shutter mechanism starts the operation in response to the detection of depression of the release button and the time when the operation of the shutter mechanism finishes. In the case where the slope limiter 102 is enabled during the autofocus operation, it is possible that the slope limiter 102 is enabled while the focus lens is being driven.

When the image capturing apparatus is configured to make the slope limiter 102 enabled both during the shutter operation and during the autofocus operation, the reference value (limiting value) to be the criteria in determining whether or not to cause the slope limiter 102 to limit the slope may be set differently for the shutter operation and the autofocus operation so that the reference value is set at appropriate values for the respective operations.

As described above, the embodiments have been discussed as examples of the technology in the present disclosure. For those purposes, the accompanying drawings and the detailed description have been provided.

Therefore, the elements shown or described in the accompanying drawings and the detailed description may include not only elements necessary to solve the problem but also elements unnecessary to solve the problem. Accordingly, it should not be interpreted that these unnecessary elements are necessary since these unnecessary elements are shown or described in the accompanying drawings and the detailed description.

Since the above described embodiments are for exemplifying the technology in the present disclosure, the embodiments may be subject to various kinds of modification, substitution, addition, and omission without departing from the scope of the claims and their equivalents.

INDUSTRIAL APPLICABILITY

The present disclosure can be applied to an image capturing apparatuses including, for example, a digital still camera, a digital video camera, and a camera-equipped information terminal.

What is claimed is:

1. An image capturing apparatus having a camera shake correction function, comprising:
    an optical system;
    a movable member configured to move on a plane perpendicular to an optical axis of the optical system, to achieve the camera shake correction function;
    an angular velocity detector configured to detect an angular velocity of shake of the image capturing apparatus and generate a detection signal; and
    a controller configured to drive the movable member based on an output from the angular velocity detector, wherein:
    the controller:
        includes a time change rate limiter configured to limit a time rate of change of angular velocity indicated by the detection signal output from the angular velocity detector to be no greater than a predetermined limiting value; and
        drives the movable member based on the detection signal output through the time change rate limiter;
    wherein when the time rate of change of angular velocity indicated by the detection signal from the angular velocity detector exceeds a predetermined reference value, the controller drives the movable member while limiting the time rate of change of angular velocity indicated by the detection signal to be no greater than the predetermined limiting value;
    wherein the predetermined limiting value is set at a value which is not less than a value of an angular acceleration which is observed due to a user's hand movement during shooting of an image; and
    wherein the predetermined limiting value is set at a value which is not less than 400 deg/s$^2$.

2. The image capturing apparatus according to claim 1, wherein the movable member is a lens.

3. The image capturing apparatus according to claim 1, wherein the movable member is an imaging device for generating image data from an optical signal.

4. The image capturing apparatus according to claim 1, wherein the controller is a microcomputer for providing a function by executing predetermined programs.

* * * * *